(12) United States Patent
Li et al.

(10) Patent No.: US 12,253,336 B1
(45) Date of Patent: Mar. 18, 2025

(54) RED DOT SIGHT

(71) Applicant: Syswit Optoelectronics Technology Co., Ltd., Guangzhou (CN)

(72) Inventors: Wenjie Li, Guangzhou (CN); Xi Wang, Guangzhou (CN)

(73) Assignee: Syswit Optoelectronics Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/428,218

(22) Filed: Jan. 31, 2024

(30) Foreign Application Priority Data

Dec. 26, 2023 (CN) .......................... 202311819188.8

(51) Int. Cl.
*F41G 3/08* (2006.01)
*G02B 27/20* (2006.01)

(52) U.S. Cl.
CPC ............... *F41G 3/08* (2013.01); *G02B 27/20* (2013.01)

(58) Field of Classification Search
CPC ....................................................... F41G 3/08
See application file for complete search history.

(56) References Cited

U.S. PATENT DOCUMENTS

| | | | |
|---|---|---|---|
| 2012/0106170 A1* | 5/2012 | Matthews | F41G 1/30 362/311.06 |
| 2014/0096431 A1* | 4/2014 | Tang | F41G 1/30 42/111 |
| 2017/0038177 A1* | 2/2017 | Sun | F41G 11/003 |
| 2018/0292168 A1* | 10/2018 | Borrico | F41G 1/30 |
| 2019/0041626 A1* | 2/2019 | Derushia | F41G 1/00 |
| 2020/0049455 A1* | 2/2020 | Hamilton | F41G 3/165 |
| 2020/0232762 A1* | 7/2020 | Hamilton | F41G 1/38 |
| 2021/0131765 A1* | 5/2021 | Beckman | F41A 19/59 |
| 2021/0348886 A1* | 11/2021 | Havens | F41G 3/165 |

FOREIGN PATENT DOCUMENTS

| | | |
|---|---|---|
| CN | 106440939 A | 2/2017 |
| CN | 107782199 A | 3/2018 |

* cited by examiner

*Primary Examiner* — Bryon T Gyllstrom
(74) *Attorney, Agent, or Firm* — Westbridge IP LLC (57) ABSTRACT

A red dot sight includes a sight body. A lens frame is arranged on a front end of the sight body, and a lens is arranged in the lens frame; a lamp holder is arranged in the sight body, a Light Emitting Diode (LED) lamp is arranged on the lamp holder, an adjustment mechanism is arranged in the sight body, a windage adjustment screw and a gravity adjustment screw are arranged on an outer side of the sight body, and the windage adjustment screw and the gravity adjustment screw are connected to the lamp holder through the adjustment mechanism; and a battery jar is formed in a side surface of the sight body. Through the reasonable design of the structure, a clearance between components of a mechanical structure is eliminated, and the smoothness of adjustment and the structural accuracy are improved.

9 Claims, 10 Drawing Sheets

RED DOT SIGHT

CROSS-REFERENCE TO RELATED APPLICATIONS

This application claims priority to Chinese Patent Application No. 202311819188.8, filed on Dec. 26, 2023, which is incorporated herein by reference in its entirety.

TECHNICAL FIELD

The application relates to the technical field of sights, and in particular to a red dot sight.

BACKGROUND

A red dot sight is an optical sight without magnification that has a bright aiming point (usually a red dot) and is generally used for auxiliary aiming in firearm shooting.

An open red dot sight is a precision optical sight. In order to adjust an imaging red dot vertically and horizontally, a mechanical structure inside the red dot sight needs to be used. In order to eliminate the red dot drift of a firearm during shooting and eliminate the lag or inaccuracy caused by a mechanical clearance during the adjustment, special design is required to eliminate a clearance between components of a mechanical mechanism and increase the smoothness of adjustment.

SUMMARY

Aiming at the deficiencies, the technical problem to be solved in the application is to provide a red dot sight. Through the reasonable design of the structure, a clearance between components of a mechanical structure is eliminated, and the smoothness of adjustment and the structural accuracy are improved.

In order to solve the above technical problems, the technical solution adopted by the application is as follows.

A red dot sight includes a sight body. A lens frame is arranged on a front end of the sight body, and a lens is arranged in the lens frame.

A lamp holder is arranged in the sight body, a Light Emitting Diode (LED) lamp is arranged on the lamp holder, an adjustment mechanism is arranged in the sight body, a windage adjustment screw and a gravity adjustment screw are arranged on an outer side of the sight body, and the windage adjustment screw and the gravity adjustment screw are connected to the lamp holder through the adjustment mechanism.

A battery jar is formed in a side surface of the sight body, a battery is detachably arranged in the battery jar, and the battery is electrically connected to the LED lamp.

Further, a first mounting groove is formed in the sight body, and the lamp holder and the adjustment mechanism are arranged in the first mounting groove.

A second mounting groove is formed in a left side or a right side of the sight body, the windage adjustment screw is rotatably arranged in the second mounting groove, a third mounting groove is formed at the top of the sight body, the gravity adjustment screw is rotatably arranged in the third mounting groove, and the second mounting groove and the third mounting groove communicate with the first mounting groove.

Further, the adjustment mechanism includes a gravity adjustment block, a windage adjustment block and a spring support block. The windage adjustment block and the spring support block are arranged on a left side and a right side of the lamp holder, the windage adjustment block and the windage adjustment screw are assembled in a threaded manner, and a first elastic piece is arranged on the side, far away from the lamp holder, of the spring support block.

A protrusion is arranged on the lamp holder, a groove is formed in the gravity adjustment block, the groove and the protrusion are fitted to each other, the gravity adjustment screw and the gravity adjustment block are assembled in a threaded manner, and a second elastic piece is arranged between the gravity adjustment block and a top surface of the first mounting groove.

Further, a third elastic piece is arranged between the lamp holder and a top surface of the second mounting groove.

Further, a left side surface and a right side surface of the lamp holder are inclined surfaces, one surface, attached to the lamp holder, of the windage adjustment block is an inclined surface, and one surface, attached to the lamp holder, of the spring support block is an inclined surface.

Further, a circle of sawtooth groove is arranged on an outer side of a screw cap of each of the windage adjustment screw and the gravity adjustment screw, a blind hole is formed in a side wall of the second mounting groove or the third mounting groove, a fourth elastic piece and an ejector pin are arranged in the blind hole, and the ejector pin is fitted to the sawtooth groove.

Further, a retaining ring and a waterproof ring are arranged on each of the windage adjustment screw and the gravity adjustment screw, and the retaining ring is configured to limit the windage adjustment screw in the second mounting groove, or limit the gravity adjustment screw in the third mounting groove.

Further, an electrode support and a battery tray are arranged in the battery jar, the electrode support and the battery tray are sequentially arranged from inside to outside, a positive elastic piece and a negative elastic piece are arranged on the electrode support, the battery tray is detachably arranged in the battery jar, and a bracket fitted to the battery is formed at the top of the battery tray.

Further, an insulating tongue is arranged at the top of the electrode support.

Further, a first fixing groove is formed in the electrode support, a plurality of protruding points are arranged on an inner wall of the first fixing groove, and one end of the positive elastic piece is arranged in the first fixing groove.

A cylindrical protrusion is arranged on the electrode support, a second fixing groove fitted to the negative elastic piece is formed in the insulating tongue, a mounting hole is formed in one end of the negative elastic piece, and the mounting hole is fitted to the cylindrical protrusion.

With the adoption of the technical solution, compared with the related art, the embodiments of the application have the following advantages.

The embodiments of the application are reasonable in design, and can eliminate the clearance between the components of the mechanical mechanism and increase the smoothness of adjustment. Through the arrangement of the first elastic piece, a thread clearance between the windage adjustment screw and the windage adjustment block is eliminated, and the lamp holder can be pushed forwards through the fitting of the inclined surfaces, so that the lamp holder is tightly attached to the inner wall of the first mounting groove to eliminate an assembling clearance between the lamp holder and the sight body. Through the arrangement of the second elastic piece, a thread clearance between the gravity adjustment screw and the gravity adjustment block is eliminated. Through the arrangement of the third elastic piece, a clearance between the lamp holder and the gravity adjustment block is eliminated, the clearance between the components is eliminated, and the smoothness of adjustment and the device accuracy are improved.

The embodiments of the application will be described in detail below with reference to the drawings and embodiments.

DETAILED DESCRIPTION OF THE EMBODIMENTS

The principle and features of the embodiments of the application will be described below with reference to the drawings, and examples described herein are for the purpose of explaining the embodiments of the application only and are not intended to limit the scope of the embodiments of the application.

In the description of the embodiments of the application, it is to be noted that the orientations or positional relationships indicated by the terms "center", "upper", "lower", "left", "right", "vertical", "horizontal", "inner", "outer", "clockwise", "counterclockwise", and the like are based on the orientations or positional relationships shown in the drawings, and are only for the convenience of describing the embodiments of the application and simplifying the description. The description does not indicate or imply that the device or element referred to must have a specific orientation, be constructed and operated in a specific orientation, and therefore cannot be construed as limiting the embodiments of the application.

Figure 1:
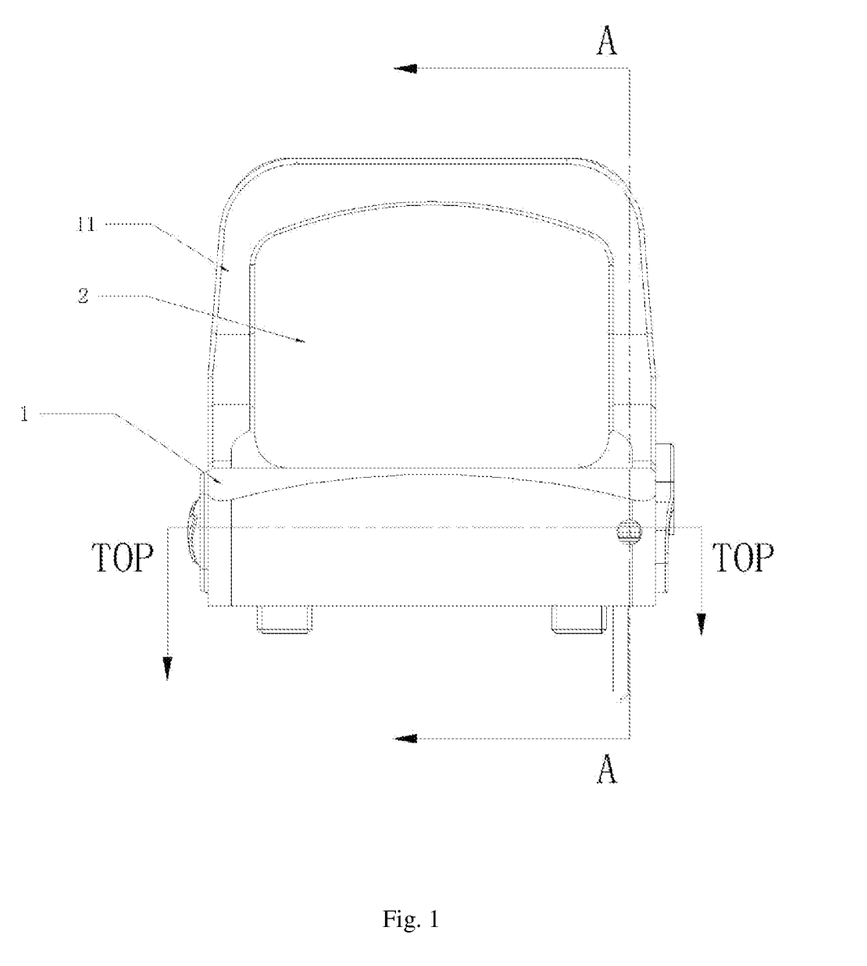
FIG. 1 is a rear view of an embodiment of the application.
Figure 4:
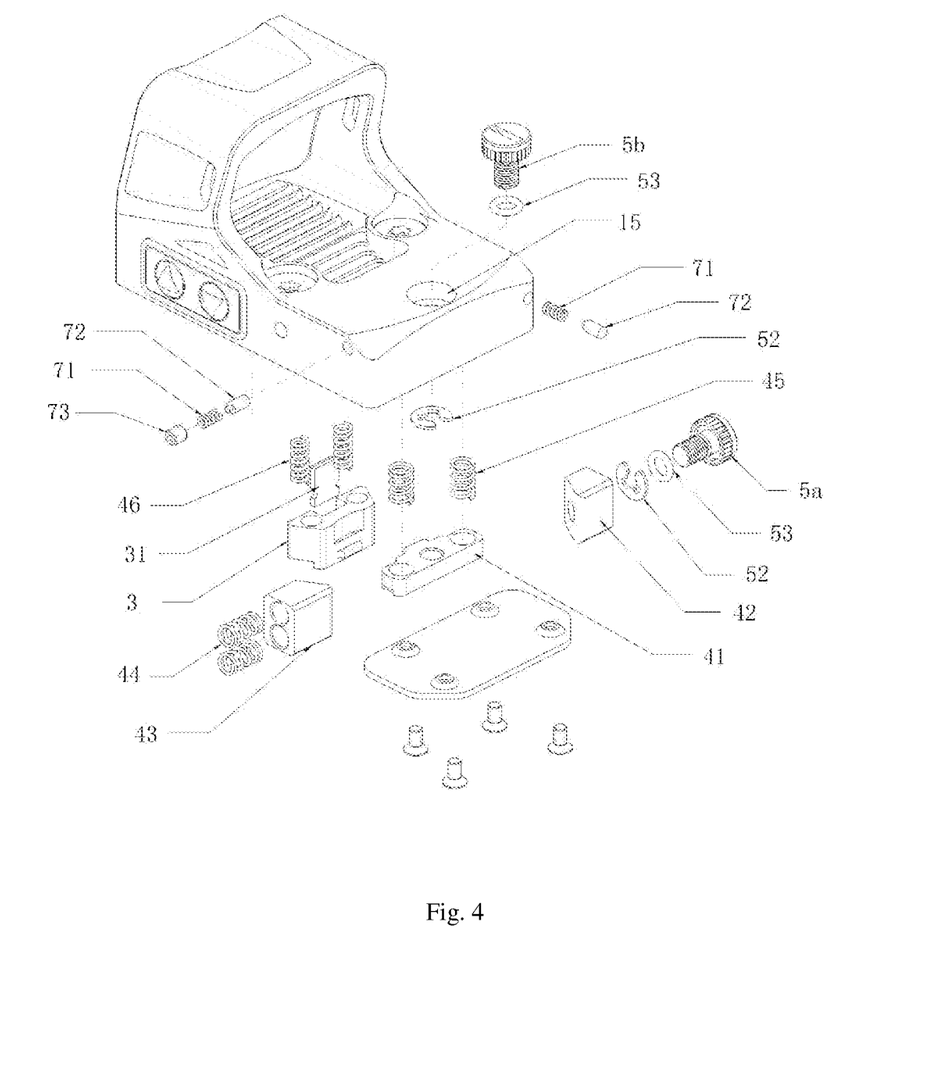
FIG. 4 is a schematic exploded view of an embodiment of the application.
Figure 8:
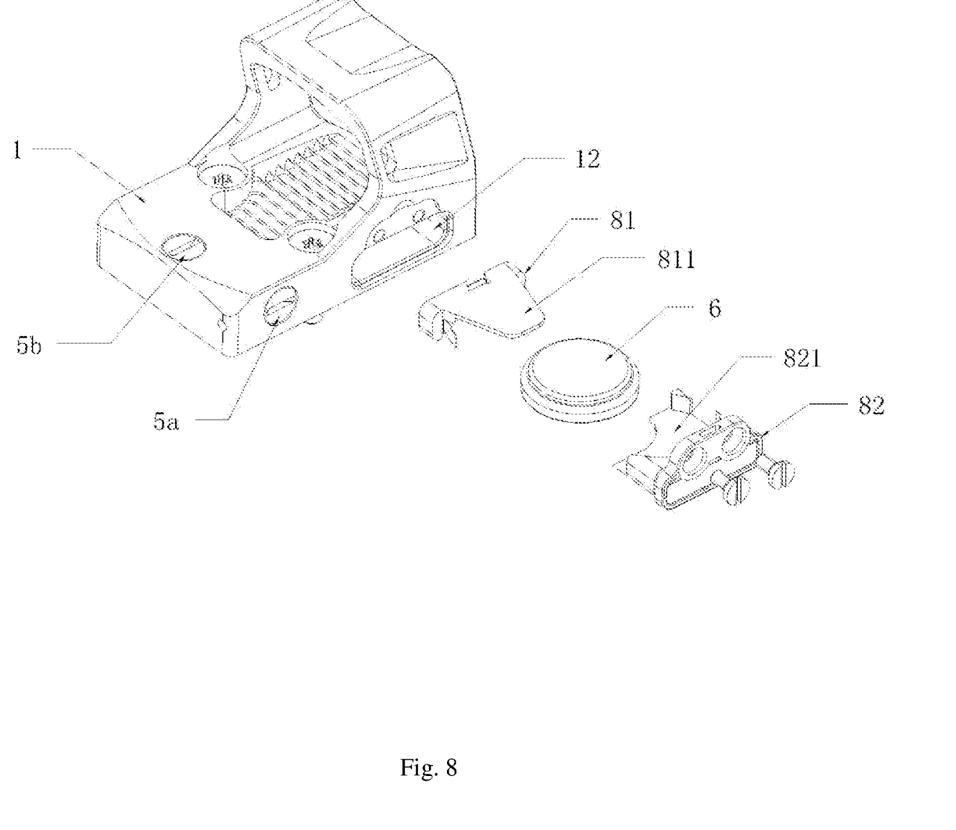
FIG. 8 is a schematic exploded view of an electrode support and a bracket of an embodiment of the application.

As shown in FIG. 1, FIG. 4 and FIG. 8, a red dot sight includes a sight body 1. A lens frame 11 is arranged on a front end of the sight body 1, and a lens 2 is arranged in the lens frame 11.

A lamp holder 3 is arranged in the sight body 1, an LED lamp 31 is arranged on the lamp holder 3, an adjustment mechanism 4 is arranged in the sight body 1, a windage adjustment screw 5a and a gravity adjustment screw 5b are arranged on an outer side of the sight body 1, and the windage adjustment screw 5a and the gravity adjustment screw 5b are connected to the lamp holder 3 through the adjustment mechanism 4.

A battery jar 12 is formed in a side surface of the sight body 1, a battery 6 is detachably arranged in the battery jar 12, and the battery is electrically connected to the LED lamp 31.

Embodiment 1

Figure 5:
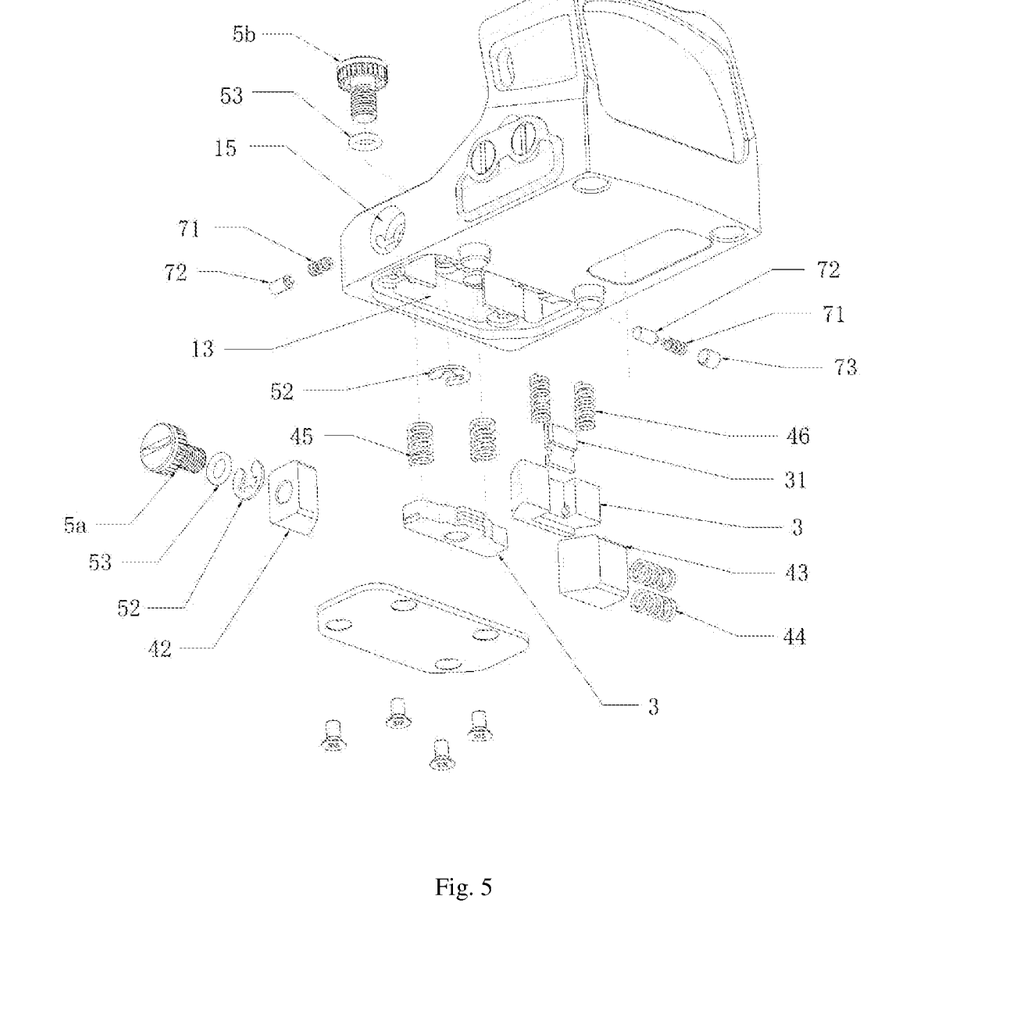
FIG. 5 is a schematic exploded view of an embodiment of the application from another perspective.

As shown in FIG. 5, a first mounting groove 13 is formed in the sight body 1, and the bottom of the first mounting groove 13 is open. A baffle is arranged at the bottom of the sight body 1, the baffle is configured to close the bottom of the first mounting groove 13, and the baffle is detachably arranged at the bottom of the sight body 1 by screws. The lamp holder 3 and the adjustment mechanism 4 are arranged in the first mounting groove 13, the LED lamp 31 is arranged on a front side of the lamp holder 3, an opening is arranged on a front end of the first mounting groove 13, and an output end of LED lamp 31 is configured to pass through the opening to be emitted to the lens 2.

In the embodiment, a second mounting groove 14 is formed in a right side of the sight body 1, a third mounting groove 15 is formed at the top of the sight body 1 and located at a rear end of the lens frame 11. The windage adjustment screw 5a is rotatably arranged in the second mounting groove 14, the gravity adjustment screw 5b is rotatably arranged in the third mounting groove 15, a retaining ring 52 and a waterproof ring 53 are arranged on each of the windage adjustment screw 5a and the gravity adjustment screw 5b, a ring groove for fixing the retaining ring 52 is arranged on the windage adjustment screw 5a or the gravity adjustment screw 5b, the retaining ring 52 is configured to limit the windage adjustment screw 5a in the second mounting groove 14, or limit the gravity adjustment screw 5b in the third mounting groove 15, and the waterproof ring 53 is arranged in a clearance between the windage adjustment screw 5a or the gravity adjustment screw 5b and the second mounting groove 14 or the third mounting groove 15 for filling the clearance to prevent water entering the sight body 1 from the outside.

As shown in FIG. 4 and FIG. 5, the adjustment mechanism 4 includes a gravity adjustment block 41, a windage adjustment block 42 and a spring support block 43. The windage adjustment block 42 and the spring support block 43 are arranged on a left side and a right side of the lamp holder 3, the windage adjustment block 42 and the windage adjustment screw 5a are assembled in a threaded manner, and a first elastic piece 44 is arranged on the side, far away from the lamp holder 3, of the spring support block 43.

Figure 6:
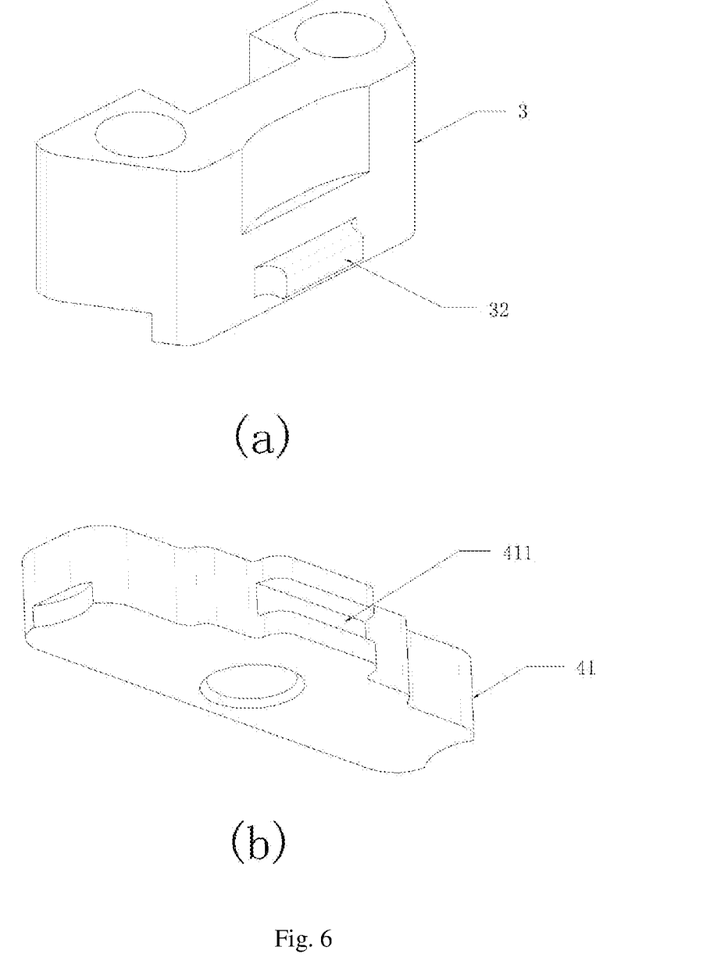
FIG. 6 is a schematic structural diagram of a lamp holder and a gravity adjustment block of an embodiment of the application, where (a) is the lamp holder and (b) is the gravity adjustment block.

As shown in FIG. 6, a protrusion 32 is arranged on the lamp holder 3, a groove 411 is formed in the gravity adjustment block 41, the groove 411 and protrusion 32 are fitted to each other, the gravity adjustment screw 5b and gravity adjustment block 41 are assembled in a threaded manner, and a second elastic piece 45 is arranged between the gravity adjustment block 41 and a top surface of the first mounting groove 13.

A third elastic piece 46 is arranged between the lamp holder 3 and a top surface of the second mounting groove 14.

The conventional gravity adjustment block is cuboid, and is not provided with a spring. In the embodiment, the spring counteracts a thread fit clearance, and the gravity adjustment block 41 is cuboid. When rotating the gravity adjustment screw 5b, the gravity adjustment block 41 is stressed to rotate, a distance between the center of the cuboid structure and both ends is longer, and the stress area is larger than that of other adjacent structures (such as the lamp holder 3), so that the influence of the adjusting rotation is smaller, thereby reducing the deformation of the spring caused by the rotation of the adjustment block, and the structure is more stable.

Figure 3:
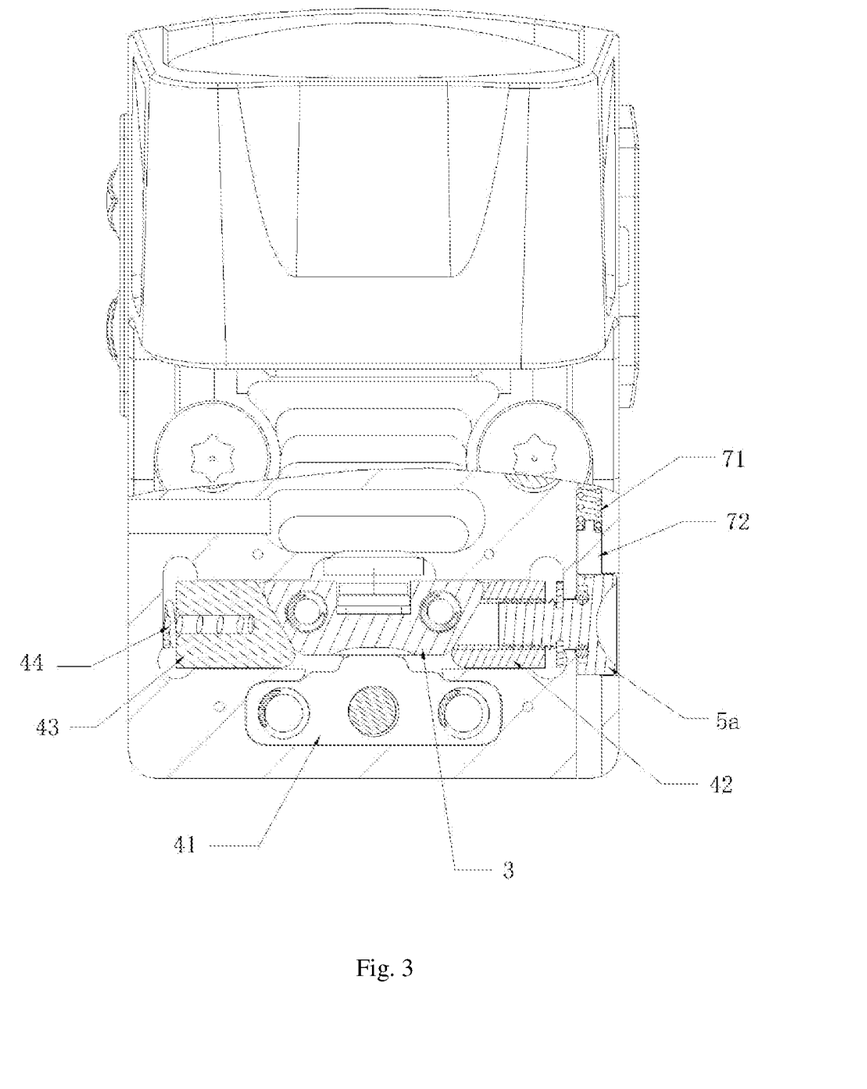
FIG. 3 is a TOP-TOP section view of FIG. 1.

As shown in FIG. 3, a left side surface and a right side surface of the lamp holder 3 are inclined surfaces, one surface, attached to lamp holder 3, of the windage adjustment block 42 is an inclined surface, and one surface, attached to lamp holder 3, of the spring support block 43 is an inclined surface.

After the red dot sight is mounted on a firearm, aiming shooting may be performed. Due to the differences in target distances, and the influence of gravity and air wind direction on the trajectory, the deviation between the impact point and the aiming point may be caused, so that it is necessary to finely adjust the vertical position and the horizontal position of the LED lamp, thereby achieving the accurate shooting to hit the target.

Horizontal adjustment of the LED lamp is as follows: the windage adjustment screw 5a is rotated, the windage adjustment screw 5a is fitted to a thread of the windage adjustment block 42, and when rotating, the windage adjustment block 42 is driven to move horizontally, thereby driving the lamp holder 3 and the LED lamp 31 to move horizontally to complete the windage adjustment in a horizontal direction. The spring support block 43 and the first elastic piece 44 (generally a spring) are arranged on the other side of the lamp holder 3, the spring support block 43 reversely abuts against the first elastic piece 44 to eliminate a thread fit clearance between the windage adjustment screw 5a and the windage adjustment block 42, and through the fitting of the inclined surfaces between the windage adjustment block 42 and the lamp holder 3 and between the spring support block 43 and the lamp holder 3, the lamp holder 3 can be squeezed forwards through the elasticity of the first elastic piece 44 to eliminate an assembling clearance between the lamp holder 3 and the first mounting groove 13.

The vertical adjustment of the LED lamp is as follows: the gravity adjustment screw 5b is rotated, the gravity adjustment screw 5b is fitted to a thread of the gravity adjustment block 41, and when rotating, the gravity adjustment block 41 is driven to move vertically, the gravity adjustment block 41 is fitted to the lamp holder 3 through the groove 411 and the protrusion 42. The gravity adjustment block 41 moves vertically to drive the lamp holder 3 and the LED lamp to move vertically, so as to complete the gravity adjustment in a vertical direction. The second elastic piece 45 (generally a spring) is configured to eliminate a thread clearance between the gravity adjustment block 41 and the gravity adjustment screw 5b, and the third elastic piece 46 (generally a spring) is configured to eliminate a fit clearance between the protrusion 42 and the groove 411.

Embodiment 2

The embodiment differs in improvement of structures of the windage adjustment screw 5a and the gravity adjustment screw 5b.

Figure 7:
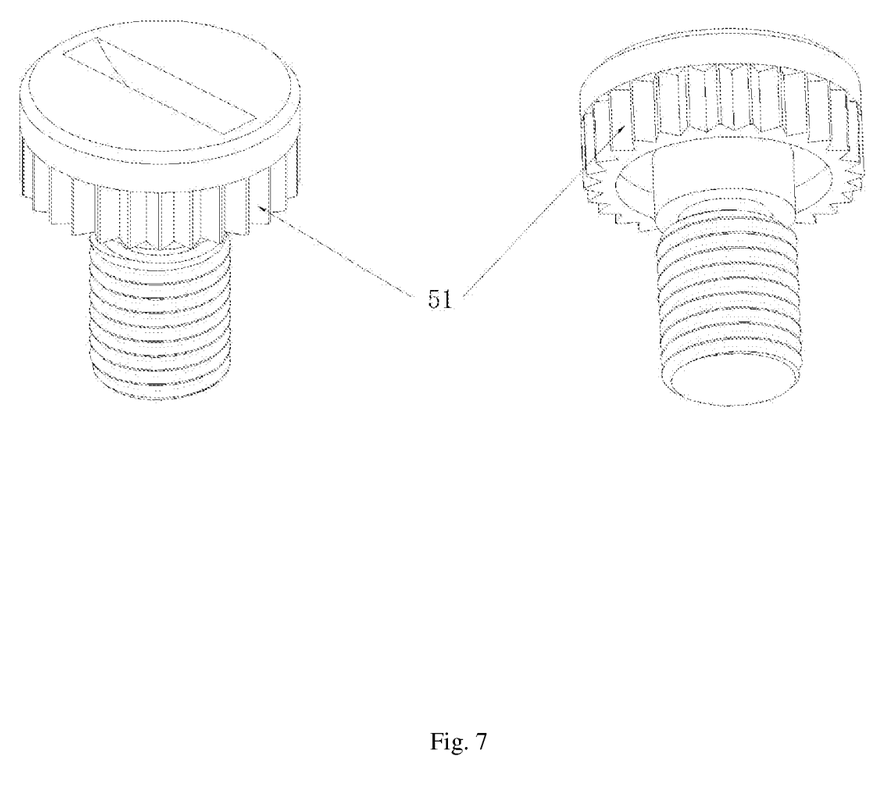
FIG. 7 is a schematic structural diagram of a windage adjustment screw or a gravity adjustment screw of an embodiment of the application.

As shown in FIG. 7, a circle of sawtooth groove 51 is arranged on an outer side of a screw cap of each of the windage adjustment screw 5a and the gravity adjustment screw 5b, and the shape of the screw cap is fitted to that of the second mounting groove 14 or the third mounting groove 15, that is, a gap between the screw cap and the second mounting groove 14 or the third mounting groove 15 is relatively small, and dust is less likely to enter the sight body 1 from the gap.

A blind hole 16 is formed in a side wall of the second mounting groove 14 or the third mounting groove 15, the position of the blind hole 16 is aligned with the sawtooth groove 51 on the screw cap, a fourth elastic piece 71 and an ejector pin 72 are arranged in the blind hole 16, the fourth elastic piece 71 is configured to push the ejector pin 72 to move to the sawtooth groove 51, and the ejector pin 72 is fitted to the sawtooth groove 71.

Figure 2:
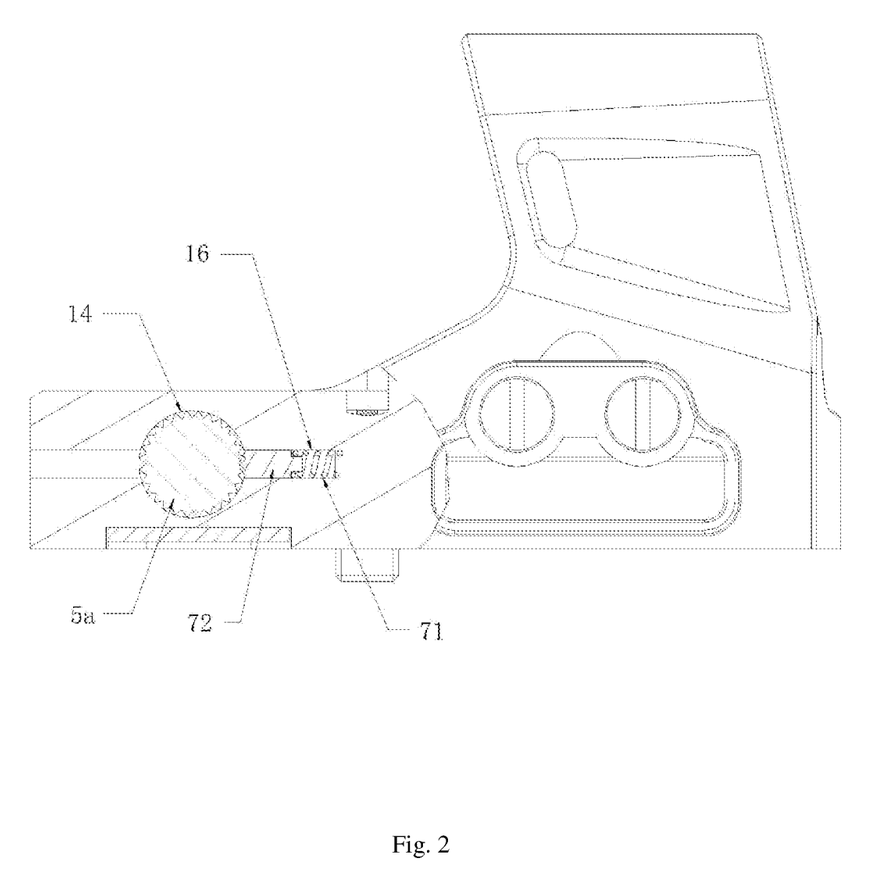
FIG. 2 is an A-A section view of FIG. 1.

As shown in FIG. 2, with respect to the mounting of the ejector pin 72, a through hole coaxial with the blind hole 16, i.e. the through hole communicating with the second mounting groove 14 or the third mounting groove 15, needs to be formed in the outer side of the sight body 1, and the fourth elastic piece 71 (generally a spring) and the ejector pin 72 are sequentially mounted in the blind hole 16 through the through hole. The design has the advantage that the other end of the blind hole 16 does not need to be blocked using a set screw 73, which can omit the steps of hole tapping, assembly of the set screw 73, gluing relaxation and the like.

When in use, the ejector pin 72 is clamped into the sawtooth groove 51 to limit the rotation of the windage adjustment screw 5a or the gravity adjustment screw 5b, so that a certain torque needs to be applied to drive the windage adjustment screw 5a or the gravity adjustment screw 5b to rotate.

As shown in FIG. 4 and FIG. 5, in the embodiment, the through hole communicating with the third mounting groove 15 is formed in the outer side of the sight body 1, and the set screw 73, the fourth elastic member 71 and the ejector pin 72 are sequentially arranged in the through hole.

Embodiment 3

The embodiment differs in improvement of a battery mounting structure.

As shown in FIG. 8, an electrode support 81 and a battery tray 82 are arranged in the battery jar 12, the electrode support 81 and the battery tray 82 are sequentially arranged from inside to outside, a positive elastic piece 83 and a negative elastic piece 84 are arranged on the electrode support 81, the battery tray 82 is detachably arranged in the battery jar 12, a bracket 821 fitted to the battery 6 is formed at the top of the battery tray 82, an insulating tongue 811 is arranged at the top of the electrode support 81. The bracket 821 is configured to block a side surface and the bottom of the battery 6 from being in contact with the battery jar 12, and the insulating tongue 811 is configured to block a top surface of the battery 6 from being in contact with the battery jar 12.

Figure 9:
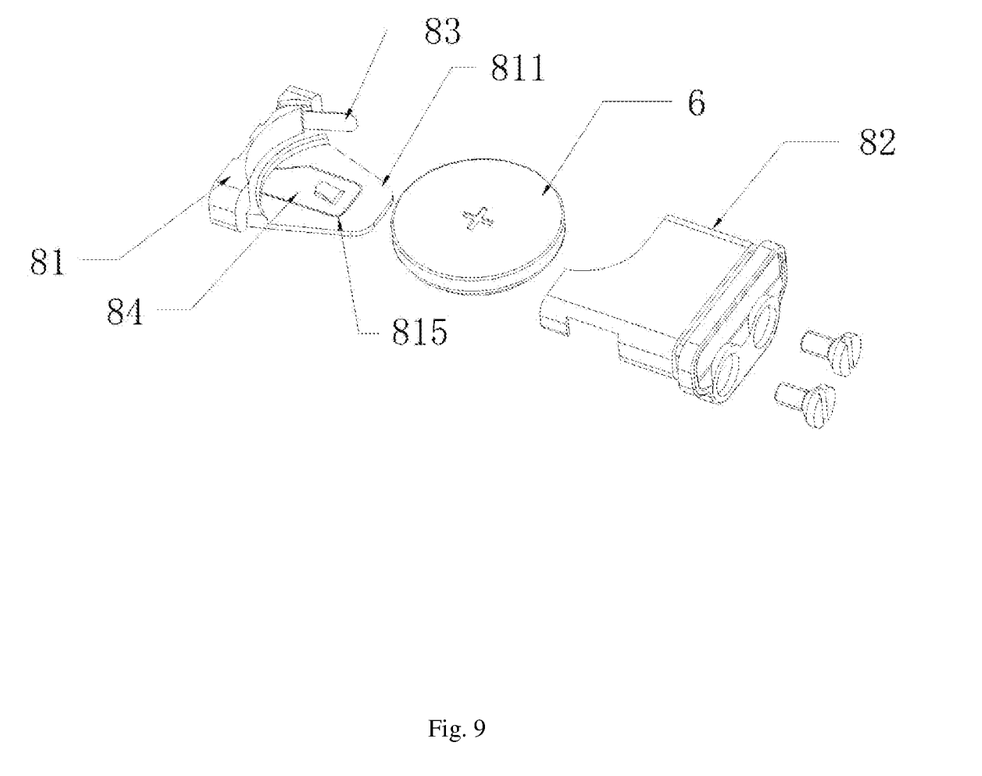
FIG. 9 is a schematic structural diagram of an electrode support and a bracket of an embodiment of the application.
Figure 10:
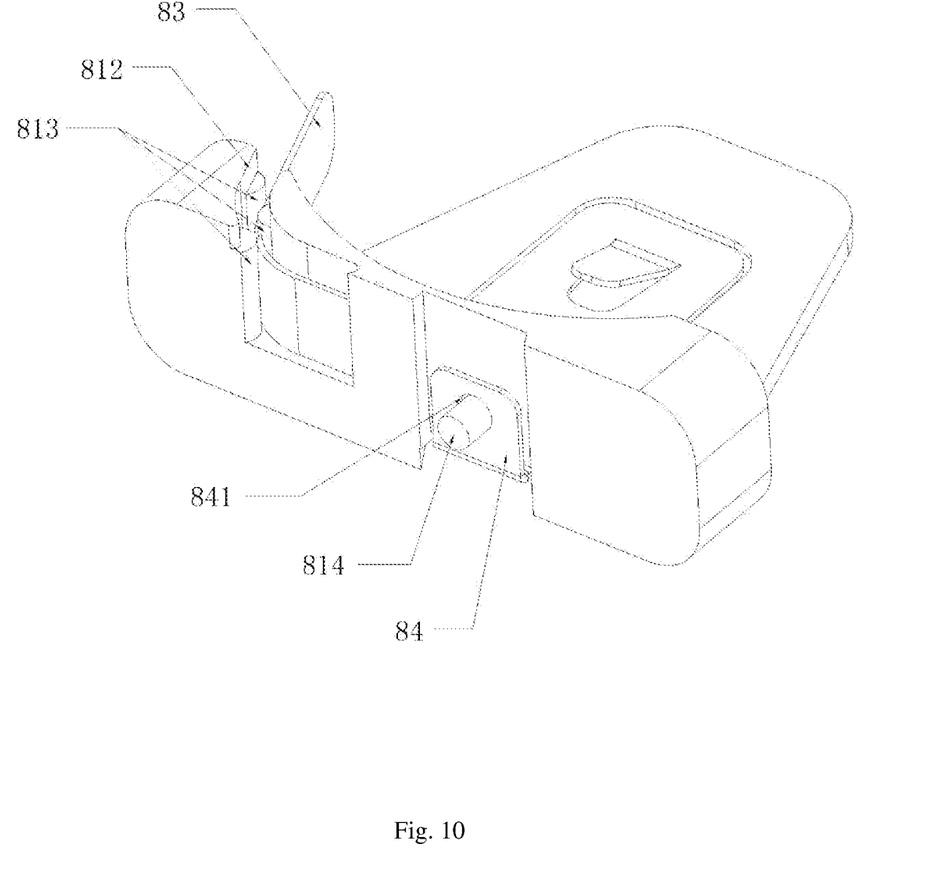
FIG. 10 is a schematic structural diagram of an electrode support of an embodiment of the application.

Positive and negative electrodes of the battery need to be powered in a very small space, so that a special plastic support is designed. As shown in FIG. 8, FIG. 9 and FIG. 10, a first fixing groove 812 is formed in the electrode support 81, a plurality of protruding points 813 are arranged on an inner wall of the first fixing groove 812, one end of the positive elastic piece 83 is arranged in first fixing groove 812, and the protruding points 813 are configured to fasten the positive elastic piece 83 in the first fixing groove 812.

A cylindrical protrusion 814 is arranged on the electrode support 81, a second fixing groove 815 fitted to the negative elastic piece 84 is formed in the insulating tongue 811, a mounting hole 841 is formed in one end of the negative elastic piece 84, the mounting hole 841 is fitted to the cylindrical protrusion 814, one end of the negative elastic piece is fixed to the electrode support 81 through the fitting of the mounting hole 841 and the cylindrical protrusion 814, and the other end thereof is embedded in the second fixing groove 814.

As shown in FIG. 8, in the embodiment, a mounting plate is arranged on an outer side of the battery tray 82, two mounting holes are formed in the mounting plate, assembly grooves fitted to the mounting plate are formed in an outer side of the battery jar 12, and two threaded holes are formed in the assembly grooves. When the battery tray 82 is mounted in the battery jar 12, the mounting plate is inserted into the assembly grooves, and the mounting holes are aligned with the assembly grooves one by one. The mounting plate is fixed in the assembly grooves by screws to complete the fixing of the battery tray 82.

The above are examples of the optimal implementations of the embodiments of the application, and the parts not described in detail are common knowledge of those of ordinary skill in the art. The scope of protection of the embodiments of the application shall be subject to the content the claims, and equivalent variations made based on the technical inspiration of the embodiments of the application shall fall within the scope of protection of the embodiments of the application.

What is claimed is:

1. A red dot sight, comprising a sight body, wherein a lens frame is arranged on a front end of the sight body, and a lens is arranged in the lens frame;
   a lamp holder is arranged in the sight body, a Light Emitting Diode (LED) lamp is arranged on the lamp holder, an adjustment mechanism is arranged in the sight body, a windage adjustment screw and a gravity adjustment screw are arranged on an outer side of the sight body, and the windage adjustment screw and the gravity adjustment screw are connected to the lamp holder through the adjustment mechanism; and
   a battery jar is formed in a side surface of the sight body, a battery is detachably arranged in the battery jar, and the battery is electrically connected to the LED lamp,
   wherein a first mounting groove is formed in the sight body, and the lamp holder and the adjustment mechanism are arranged in the first mounting groove; and
   a second mounting groove is formed in a left side or a right side of the sight body, the windage adjustment screw is rotatably arranged in the second mounting groove, a third mounting groove is formed at a top of the sight body, the gravity adjustment screw is rotatably arranged in the third mounting groove, and the second mounting groove and the third mounting groove communicate with the first mounting groove.

2. The red dot sight according to claim 1, wherein the adjustment mechanism comprises a gravity adjustment block, a windage adjustment block and a spring support block, wherein the windage adjustment block and the spring support block are arranged on a left side and a right side of the lamp holder, the windage adjustment block and the windage adjustment screw are assembled in a threaded manner, and a first elastic piece is arranged on a side, far away from the lamp holder, of the spring support block; and
   a protrusion is arranged on the lamp holder, a groove is formed in the gravity adjustment block, the groove and the protrusion are fitted to each other, the gravity adjustment screw and the gravity adjustment block are assembled in a threaded manner, and a second elastic piece is arranged between the gravity adjustment block and a top surface of the first mounting groove.

3. The red dot sight according to claim 2, wherein a third elastic piece is arranged between the lamp holder and a top surface of the second mounting groove.

4. The red dot sight according to claim 2, wherein a left side surface and a right side surface of the lamp holder are inclined surfaces, one surface, attached to the lamp holder, of the windage adjustment block is an inclined surface, and one surface, attached to the lamp holder, of the spring support block is an inclined surface.

5. The red dot sight according to claim 1, wherein a circle of sawtooth groove is arranged on an outer side of a screw cap of each of the windage adjustment screw and the gravity adjustment screw, a blind hole is formed in a side wall of the second mounting groove or the third mounting groove, a fourth elastic piece and an ejector pin are arranged in the blind hole, and the ejector pin is fitted to the sawtooth groove.

6. The red dot sight according to claim 1, wherein a retaining ring and a waterproof ring are arranged on each of the windage adjustment screw and the gravity adjustment screw, and the retaining ring is configured to limit the windage adjustment screw in the second mounting groove, or limit the gravity adjustment screw in the third mounting groove.

7. The red dot sight according to claim 1, wherein an electrode support and a battery tray are arranged in the battery jar, the electrode support and the battery tray are sequentially arranged from inside to outside, a positive elastic piece and a negative elastic piece are arranged on the electrode support, the battery tray is detachably arranged in the battery jar, and a bracket fitted to the battery is formed at the top of the battery tray.

8. The red dot sight according to claim 7, wherein an insulating tongue is arranged at the top of the electrode support.

9. The red dot sight according to claim 8, wherein a first fixing groove is formed in the electrode support, a plurality of protruding points are arranged on an inner wall of the first fixing groove, and one end of the positive elastic piece is arranged in the first fixing groove; and
   a cylindrical protrusion is arranged on the electrode support, a second fixing groove fitted to the negative elastic piece is formed in the insulating tongue, a mounting hole is formed in one end of the negative elastic piece, and the mounting hole is fitted to the cylindrical protrusion.

* * * * *